United States Patent
Gordon et al.

(10) Patent No.: US 11,866,677 B2
(45) Date of Patent: Jan. 9, 2024

(54) COPOLYMER FORMULATIONS OF POLY (ITACONIC ACID-CO-2-ACRYLAMIDO-2-METHYLPROPANE SULFONIC ACID) FOR DISHWASHER DETERGENT COMPOSITIONS

(71) Applicant: Itaconix Corporation, Stratham, NH (US)

(72) Inventors: James William Gordon, Cumbria (GB); Bo Jiang, Brentwood, NH (US); Yvon Durant, Lee, NH (US); John Shaw, Hampton Falls, NH (US)

(73) Assignee: ITACONIX CORPORATION, Stratham, NH (US)

( * ) Notice: Subject to any disclaimer, the term of this patent is extended or adjusted under 35 U.S.C. 154(b) by 87 days.

(21) Appl. No.: 17/248,705

(22) Filed: Feb. 3, 2021

(65) Prior Publication Data
US 2021/0238503 A1    Aug. 5, 2021

Related U.S. Application Data

(60) Provisional application No. 62/970,500, filed on Feb. 5, 2020.

(51) Int. Cl.
| | | |
|---|---|---|
| *C11D 3/37* | (2006.01) | |
| *C11D 7/26* | (2006.01) | |
| *C08F 222/02* | (2006.01) | |
| *C11D 17/04* | (2006.01) | |
| *C11D 11/00* | (2006.01) | |

(52) U.S. Cl.
CPC .......... *C11D 3/378* (2013.01); *C08F 222/02* (2013.01); *C11D 3/3761* (2013.01); *C11D 3/3765* (2013.01); *C11D 11/0023* (2013.01); *C11D 17/042* (2013.01); *C11D 17/043* (2013.01); *C08F 2800/20* (2013.01)

(58) Field of Classification Search
CPC ..... C11D 3/3761; C11D 3/3765; C11D 3/378; C11D 17/042; C11D 17/043
USPC ........ 510/220, 223, 475, 477, 492, 499, 501
See application file for complete search history.

(56) References Cited

U.S. PATENT DOCUMENTS

| | | |
|---|---|---|
| 10,472,594 B2 | 11/2019 | Jiang et al. |
| 2014/0319063 A1 | 10/2014 | Hernandez Altamirano et al. |
| 2016/0090553 A1* | 3/2016 | Wang .................... C08F 216/16 526/287 |
| 2019/0367842 A1* | 12/2019 | Tuerk ...................... C11D 3/33 |

FOREIGN PATENT DOCUMENTS

| | | | | |
|---|---|---|---|---|
| EP | 2896637 A1 * | 7/2015 | .......... | C08F 293/005 |
| WO | 2015138872 A1 | 9/2015 | | |
| WO | WO-2015138872 A1 * | 9/2015 | ................ | C08F 2/22 |
| WO | WO-2019211231 A1 * | 11/2019 | ............... | C11D 1/66 |
| WO | WO-2019233696 A1 * | 12/2019 | | |

OTHER PUBLICATIONS

International Search Report and Written Opinion dated Feb. 3, 2021 issued in related International Patent Application No. PCT/US2021/70122.
Office Action from related Chinese Appln. No. 202180026455.9, dated Jun. 22, 2023. English translation attached.

* cited by examiner

*Primary Examiner* — Gregory R Delcotto
(74) *Attorney, Agent, or Firm* — Grossman, Tucker, Perreault & Pfleger, PLLC

(57) ABSTRACT

The present invention relates to copolymer formulations of poly(itaconic acid-co-2-acrylamido-2-methylpropane sulfonic acid) for dishwasher detergent compositions with a controlled amount of a second polymeric component.

17 Claims, No Drawings

COPOLYMER FORMULATIONS OF POLY (ITACONIC ACID-CO-2-ACRYLAMIDO-2-METHYLPROPANE SULFONIC ACID) FOR DISHWASHER DETERGENT COMPOSITIONS

CROSS-REFERENCE TO RELATED APPLICATIONS

This application claims the benefit of U.S. provisional application Ser. No. 62/970,500, filed Feb. 5, 2020, the entire disclosure of which is incorporated herein by reference.

FIELD

The present invention relates to copolymer formulations of poly(itaconic acid-co-2-acrylamido-2-methylpropane sulfonic acid) for dishwasher detergent compositions with a controlled amount of a second polymeric component.

BACKGROUND

The use of copolymers containing a carboxylic acid monomer and a sulfonic acid monomer have been reported. See, e.g., U.S. Pat. No. 8,288,333 directed at a process for making a detergent composition. Reference is also made to U.S. Publ. No. 2014/0319063 which is directed at a process to obtain random copolymers derived from itaconic acid and/or its isomers and sodium alkenyl sulfonates. Attention is also directed to PCT/US2015/020408 entitled Itaconic Acid Polymers and Copolymers.

Reference is also made to U.S. Pat. No. 10,472,594 entitled Sulfonated Copolymers For Detergent Composition. A dishwasher composition is disclosed therein that includes a copolymer of itaconic acid with 2-acrylamido-2-methypropane sulfonic acid which copolymer is present at a level of 2.0% by weight to 30.0% by weight which is then combined with a second copolymer, present at a level of 1.0% by weight to 15.0% by weight, where the second copolymer includes poly(acrylic acid-co-2-acrylamido-2-methypropane sulfonic acid).

Accordingly, a need remains to provide dishwasher compositions with a polymeric ingredient that can rely primarily or only upon the copolymer of poly(itaconic acid-co-2-acrylamido-2-methypropane sulfonic acid) and which dishwasher composition is also of a relatively reduced weight as compared to more typical dishwasher formulations currently utilized for domestic type dishwasher applications.

SUMMARY

A dishwasher detergent formulation comprising:
(a) a first copolymer A having the following structure:

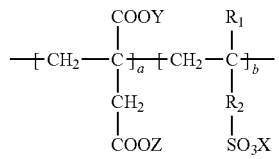

where $R_1$ is a hydrogen, or a —$CH_3$, —$CH_2CH_3$, —$CH_2CH_2CH_3$ group;
X, Y and Z are either hydrogen or Na+, Li+, K+ and/or $NH_4$+ and can be the same or different;
$R_2$ is an amido group (—CONH—) to provide acrylamide-alkyl sulfonic acid functionality (—CONH—$R_3$—$SO_3X$) wherein $R_3$ is a —$CH_2$—, —$CH_2CH_2$—, —$CH_2$—$CH_2$—$CH_2$—, —C—$(CH_3)_2$ or —C—$(CH_3)_2$—$CH_2$— group;
wherein the weight percent of repeat unit "a" in said copolymer is present at a level of 55.0 wt. % to 79.0 wt. % and the weight percent of repeat unit "b" in said copolymer is present at a level of 45.0 wt. % to 21.0 wt. % and wherein copolymer A has a number average molecular weight (Mn) from 1000 to 4500 grams per mole;
(b) a second polymeric ingredient B; and
wherein said dishwasher formulation contains 0.3% by weight to 15.0% by weight copolymer A and less than 1.0% by weight of said second polymeric ingredient B.

DETAILED DESCRIPTION

The present invention is directed at a detergent composition that relies upon the use of a first copolymer A having the following structure:

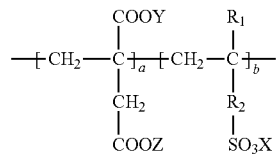

where $R_1$ is a hydrogen, or a —$CH_3$, —$CH_2CH_3$, —$CH_2CH_2CH_3$ group;
X, Y and Z are either hydrogen or Na+, Li+, K+ and/or $NH_4$+ and can be the same or different;
$R_2$ is an amido group (—CONH—) to provide acrylamide-alkyl sulfonic acid functionality (—CONH—$R_3$—$SO_3X$) wherein $R_3$ is a —$CH_2$—, —$CH_2CH_2$—, —$CH_2$—$CH_2$—$CH_2$—, —C—$(CH_3)_2$ or —C—$(CH_3)_2$—$CH_2$— group;
wherein the weight percent of repeat unit "a" is present at a level of 55.0 wt. % to 79.0 wt. % and the weight percent of repeat unit "b" is present at a level of 45.0 wt. % to 21.0 wt. %. Preferably, the weight percent of repeat unit "a" in said copolymer may fall in the range of 70.0 wt % to 79.0 wt. % and the weight percent of repeat unit "b" in said copolymer may fall in the range of 30.0 wt. % to 21.0 wt. %. One particularly preferred value for repeat unit "a" is 76.0 wt. % at ±2.0 wt. % and one particularly preferred value for repeat unit "b" is 24.0 wt. % at ±2.0 wt. %.

Preferably, copolymer A is prepared by copolymerization of itaconic acid (providing two carboxylic acid groups) with a sulfonated vinyl monomer containing an amido group (—CONH—). Itaconic acid is reference to the formula $C_5H_6O_4$ or the formula $CH_2$=$C(COOH)CH_2COOH$. Preferably the sulfonated vinyl monomers include the acid or alkali salt of: 2-acrylamido-2-methylpropane sulfonic acid (AMPS). The alkali salt may preferably include the Na+, Li+, K+ and/or NH4+ salt of the sulfonic acid group. Accordingly, all such monomers may be copolymerized with itaconic acid or an alkali salt (such as Na+, Li+, K+, $NH_4$+) of itaconic acid and relied upon to form copolymer A herein.

In formula configuration, the monomers that copolymerize with itaconic acid and provide sulfonic acid group functionality include:

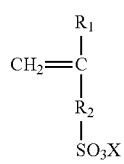

wherein R₁ may be hydrogen or an alkyl group (—CH₃, —CH₂CH₃, —CH₂CH₂CH₃). R₂ includes an amido group (—CONH—) to thereby provide acrylamide-alkyl sulfonic acid functionality (—CONH—R₃—SO₃X) where R₃ may comprise an alkyl group (—CH₂—, —CH₂CH₂—, —CH₂CH₂CH₂— or an isopropyl group such as —C—(CH₃)₂, —C—(CH₃)₂—CH₂—). In addition, X can be either hydrogen or Na+, Li+, K+ and/or NH4+.

Copolymer A preferably has a number average molecular weight (Mn) from 1000 to 4500 grams per mole and/or a weight average molecular weight (Mw) of 2000 to 9000 grams per mole. Preferably, copolymer A may have a Mn value of 1000-4200 or 2000-4200 grams per mole. Preferably, the Mw value is 2000 to 7500 grams per mole. In addition, it should be noted that copolymer A recited herein may itself optionally include one or more additionally polymerized comonomer units. Such units may include, but not be limited to polymerized vinyl comonomers, such as acrylic acid, methacrylic acid, maleic anhydride, vinyl acetate, ethylene, propylene, acrylates such as methyl acrylate or methylmethacrylate, vinyl ethers, styrene and/or α-methyl styrene. However, while they are optionally included, polymerized itaconic acid is always present, providing a vinyl monomer repeating unit with two carboxylic acid groups.

Copolymer A is preferably present in the dishwasher formulation herein at a level of 0.3% by weight to 15.0% by weight. More preferably, the level of copolymer A in the dishwashing formulation herein is 3.0% by weight to 12.0% by weight, or even more preferably, at a level of 4.0% by weight to 10.0% by weight. In one particularly preferred embodiment, the level of copolymer A in the dishwashing formulation is such that it is present at a level of 5.0% by weight to 8.0% by weight.

The polymeric component of the dishwasher formulation herein includes a relatively limited amount of a second polymeric ingredient B. This has been found to provide a dishwashing formulation that still maintains relatively efficient cleaning performance and which therefore preferably and advantageously minimizes the number of polymeric components in the formulation. This then provides relatively improved control of manufacturing costs and relatively improved environmental considerations.

Accordingly, the level of the second polymeric ingredient is preferably maintained at a level of less than 1.0% by weight in the dishwasher formulation. Accordingly, it may be appreciated that the dishwashing formulation herein is such that preferably it contains 0.0% by weight of a second polymeric ingredient B. Accordingly, it may therefore be understood that the dishwashing formulation herein is such that with respect to a polymeric ingredient, it only contains copolymer A and no other polymeric ingredient. In addition, the dishwashing formulation herein is one that also includes: (1) up to and including 0.1% by weight of a second polymeric ingredient B; (2) up to and including 0.2% by weight of a second polymeric ingredient B; (3) up to and including 0.3% by weight of a second polymeric ingredient B; (4) up to and including 0.4% by weight of a second polymeric ingredient B; (5) up to and including 0.5% by weight of a second polymeric ingredient B; (6) up to and including 0.6% by weight of a second polymeric ingredient B; (7) up to and including 0.7% by weight of a second polymeric ingredient B; (8) up to and including 0.8% by weight of a second polymeric ingredient B; (9) up to and including 0.9% by weight of a second polymeric ingredient B; and (10) up to but not including 1.0% by weight of a second polymeric ingredient B.

The relatively limited amount of the second polymeric ingredient herein can be selected from one or more of the following:
(a) a homopolymer or copolymer of poly(acrylic acid);
(b) a homopolymer or copolymer of a poly(alkylacrylic acid);
(c) poly(aspartic acid); or
(d) poly(carboxy methyl inulin)

The relatively limited amount of the second polymeric ingredient may therefore include any one or more of the following structures:

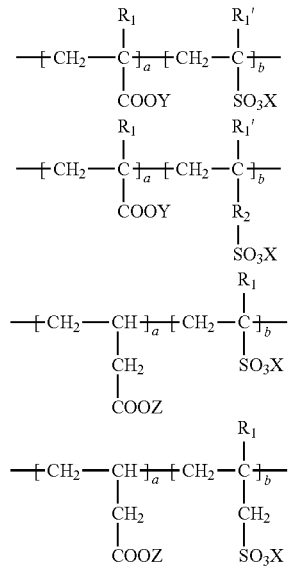

wherein R₁ and R₁' are a hydrogen or an alkyl group (—CH₃, —CH₂CH₃, —CH₂CH₂CH₃) and can be the same or different;

X, Y and Z are either hydrogen or Na+, Li+, K+ and/or NH₄+;

R₂ is an alkyl group (—CH₂—, —CH₂CH₂—, —CH₂CH₂CH₂—, —C—(CH₃)₂) or an aromatic group or an ester group (—COOCH₂—) or an amido group (—CONH—) to thereby provide acrylamide-alkyl sulfonic acid functionality (—CONH—R₃—SO₃X) where R₃ is an alkyl group (—CH₂—, —CH₂CH₂—, —CH₂CH₂CH₂—, —C—(CH₃)₂, —C—(CH₃)₂—CH₂—). In the above formulas, preferably, the weight percent of the repeat unit "a" is such that it is present in excess to the weight percent of repeat unit "b."

Other components of the dishwashing formulation herein is such that it may include, e.g., soda ash, sodium percarbonate, a bleach catalyst or activator, enzymes (e.g., a protease or amylase enzyme), a chelate such as sodium citrate, or optionally, methyglycine N,N-diacetic acid (MGDA) or other amino carboxlyates, a surfactant (e.g. a non-ionic surfactant). In addition, the dishwashing formulation herein is preferably one that utilizes ≤0.10% by wt. of a phosphonate. Accordingly, the level of phosphonate may be in the range of 0 to ≤0.10% by weight. Accordingly, the formulations herein may be phosphonate free. A phosphonate is reference to an organophosphorous compound containing C—PO(OH)$_2$ or C—PO(OR)$_2$ groups where R is an alkyl or aryl group. In addition, the dishwashing formulations herein are such that preferably, they contain, less than 3.0% by weight of citraconic and/or mesaconic acid.

In addition, the dishwashing formulation here is such that it is preferably configured in a pod or other monodose form such as a tablet, which is reference to placement of the dishwasher formulation within a dissolvable film that breaks apart and dissolves in water, freeing the formulation for an effective washing cycle. Such pod or tablet may therefore contain copolymer A herein and the limited amount of a second polymer component along with other more typical dishwashing formulation ingredients. Such dissolvable film preferably includes a poly(vinyl alcohol) based film. Such dissolvable pod may have one or more compartments. The pods or tablets herein also preferably have a weight of 9.0 to 16.0 grams, or any range or value therein. Accordingly, a dishwashing formulation herein in pod or tablet form herein may have a weight of 9.0 to 16.0 grams, or 9.0 to 15.0 grams, or 9.0 to 14.0 grams, or 9.0 to 13.0 grams, or 9.0 to 12.0 grams, or 9.0 to 11.0 grams, or 9.0 to 10.0 grams. As noted herein, the amount of the poly(itaconic acid-co-AMPS) copolymer in such dishwashing pod preferably falls in the range of 0.3% by weight to 15.0% by weight and the level of any other polymeric ingredient is less than 1.0% by weight.

WORKING EXAMPLES

Example 1—Polyitaconic Acid (84.0% by Weight)—Poly(2-Acrylamido-2-Methylpropane Sulfonic Acid) (16.0% by Weight)

To a production reactor, the following were added: 2763.39 lb of itaconic acid, 752.47 lb of sodium hydroxide, 1165.17 lb of AMPS (50% active), 106.51 lb of hypophosphorous acid (50% aqueous). The ingredients fed to the reactor in ratio and were mixed together within the reactor and heated to 92° C. 226.28 lb of a 33 wt. % solution of sodium persulfate was added. The mixture was allowed to react and removed from the heat source once the reaction mixture started to show exothermic behavior. The sample was left to cool to room temperature for 12 hours to a dry solid. It was then ground to a powder with a utility mechanical mixer. The final powder has a moisture content of 9.95%, a monomer to polymer conversion of 97%, a molecular weight number average of 1910 g/mol and a molecular weight, weight average of 3860 g/mol. Residual monomer analysis quantified a residual combined citraconic and mesaconic acid of 2.26%, a residual itaconic acid of 1.35% and a residual AMPS of 0.11%. pH of 10% solution in water was measure at 4.9.

Example 2—Polyitaconic Acid (80.0% by Weight)—Poly(2-Acrylamido-2-Methylpropane Sulfonic Acid) (20.0% by Weight)

To a 1000 mL glass beaker, the following were added: 72.07 g of itaconic acid, 19.79 g of sodium hydroxide, 39.81 g of AMPS (50% active), 4.61 g of hypophosphorous acid (50% aqueous). The ingredients were mixed together with a stir bar and heated to 95 C. Then 7.21 g of a 33 wt. % solution of sodium persulfate was added. The mixture was allowed to react and removed from the heat source once the reaction mixture started to show exothermic behavior. The sample was left to cool to room temperature for 12 hours to a dry solid. It was then ground to a powder with a utility mechanical mixer. The final powder has a moisture content of 8.8%, a monomer to polymer conversion of 98%, a molecular weight number average of 1470 g/mol and a molecular weight, weight average of 2860 g/mol. Residual monomer analysis quantified a residual combined citraconic and mesaconic acid of 2.86%, a residual itaconic acid of 0.33% and a residual AMPS of 0.07%. pH of 10% solution in water was measure at 4.9.

Example 3—Polyitaconic Acid (76.0% by Weight)—Poly(2-Acrylamido-2-Methylpropane Sulfonic Acid) (24.0% by Weight)

To a production reactor, the following were added: 481.17 lb of itaconic acid, 137.47 lb of sodium hydroxide, 309.76 lb of AMPS (50% active), 22.45 lb of 2-Acrylamido-2-methylpropane sulfonic acid, 29.75 lb of hypophosphorous acid (50% aqueous). The ingredients fed to the reactor in ratio and were mixed together with in the reactor and heated to 92 C. 33.17 lb of a 33 wt. % solution of sodium persulfate was added. The mixture was allowed to react and removed from the heat source once the reaction mixture started to show exothermic behavior. The sample was left to cool to room temperature for 12 hours to a dry solid. It was then ground to a powder with a utility mechanical mixer. The final powder has a moisture content of 11.1%, a monomer to polymer conversion of 97%, a molecular weight number average of 1280 g/mol and a molecular weight, weight average of 4180 g/mol. Residual monomer analysis quantified a residual combined citraconic and mesaconic acid of 1.13%, a residual itaconic acid of 0.58% and a residual AMPS of 0.04%. pH of 10% solution in water was measure at 5.1.

Example 4—Polyitaconic Acid (76.0% by Weight)—Poly(2-Acrylamido-2-Methylpropane Sulfonic Acid) (24.0% by Weight) at Relatively High MW To a 1000 mL glass beaker, the following were added: 68.43 g of itaconic acid, 20.54 g of sodium hydroxide, 48.0 g of AMPS (50% active). The ingredients were mixed together with a stir bar and heated to 95 C. Then 4.6 g of a 33 wt. % solution of sodium persulfate was added. The mixture was allowed to react and removed from the heat source once the reaction mixture started to show exothermic behavior. The sample was left to cool to room temperature for 12 hours to a dry solid. It was then ground to a powder with a utility mechanical mixer. The final powder has a moisture content of 8.23%, a monomer to polymer conversion of greater than 98%, a number average molecular weight (Mn) of 5700 g/mol and a weight average molecular weight (Mw) of 23400 g/mol. Residual monomer analysis quantified a residual combined citraconic and mesaconic acid of 0.91%, a residual itaconic acid of 1.21% and a residual AMPS of 0.12%. pH of 10% solution in water was measured at 5.8.

Example 5—Polyitaconic Acid (70.0% by Weight)—Poly(2-Acrylamido-2-Methylpropane Sulfonic Acid) (30.0% by Weight)

To a 1000 mL glass beaker, the following were added: 64.69 g of Itaconic acid, 23.18 g of sodium hydroxide, 27.72 g of 2-acrylamido-2-methylpropane sulfonic acid, 7.02 g of hypophosphorous acid (50% aqueous), 23.95 g of water. The ingredients were mixed together with a stir bar and heated to 95 C. Then 4.9 g of a 33 wt. % solution of sodium persulfate was added. The mixture was allowed to react and removed from the heat source once the reaction mixture started to show exothermic behavior. The sample was left to cool to room temperature for 12 hours to a dry solid. It was then ground to a powder with a utility mechanical mixer. The final powder has a moisture content of 8.8%, a monomer to polymer conversion of greater than 98%, a molecular weight number average of 1610 g/mol and a molecular weight, weight average of 3230 g/mol. Residual monomer analysis quantified a residual combined citraconic and mesaconic acid of 0.30%, a residual itaconic acid of 0.04% and a residual AMPS below the detection limit. pH of 10% solution in water was measure at 4.8.

Example 6—Polyitaconic Acid (65.0% by Weight)—Poly(2-Acrylamido-2-Methylpropane Sulfonic Acid) (35.0% by Weight)

To a 1000 mL glass beaker, the following were added: 61.33 g of itaconic acid, 25.18 g of sodium hydroxide, 33.16 g of 2-acrylamido-2-methylpropane sulfonic acid, 7.03 g of hypophosphorous acid (50% aqueous), 23.91 g of water. The ingredients were mixed together with a stir bar and heated to 95 C. Then 4.9 g of a 33 wt. % solution of sodium persulfate was added. The mixture was allowed to react and removed from the heat source once the reaction mixture started to show exothermic behavior. The sample was left to cool to room temperature for 12 hours to a dry solid. It was then ground to a powder with a utility mechanical mixer. The final powder has a moisture content of 7.8%, a monomer to polymer conversion of greater than 95%, a number average molecular weight (Mn) of 1140 g/mol and a weight average molecular weight (Mw) of 3280 g/mol. Residual monomer analysis quantified a residual combined citraconic and mesaconic acid of 0.09%, a residual itaconic acid of 0.03% and a residual AMPS below the detection limit. pH of 10% solution in water was measure at 5.0.

Example 7—Polyitaconic Acid (55.0% by Weight)—Poly(2-Acrylamido-2-Methylpropane Sulfonic Acid) (45.0% by Weight)

To a 1000 mL glass beaker, the following were added: 54.22 g of itaconic acid, 27.39 g of sodium hydroxide, 44.37 g of 2-acrylamido-2-methylpropane sulfonic acid, 7.04 g of hypophosphorous acid (50% aqueous), 23.93 g of water. The ingredients were mixed together with a stir bar and heated to 95 C. Then 4.9 g of a 33 wt. % solution of sodium persulfate was added. The mixture was allowed to react and removed from the heat source once the reaction mixture started to show exothermic behavior. The sample was left to cool to room temperature for 12 hours to a dry solid. It was then ground to a powder with a utility mechanical mixer. The final powder has a moisture content of 10.7%, a monomer to polymer conversion of greater than 98%, a molecular weight number average of 1250 g/mol and a molecular weight, weight average of 3740 g/mol. Residual monomer analysis quantified a residual combined citraconic and mesaconic acid of 0.10%, a residual itaconic acid of 0.03% and a residual AMPS of 0.02%. pH of 10% solution in water was measure at 5.5.

The above seven (7) polymer formulations were subject to a scale inhibition test. The scale inhibition test measures the light transmittance of an aqueous solution at 54° C. During the test, $CaCO_3$ is created by adding calcium chloride into a sodium carbonate aqueous solution containing the polymer under evaluation. In presence of a polymer that provides scale inhibition, the test medium is more likely to remain transparent as the polymer acting as a scale inhibitor can then limit the growth and size of the as formed $CaCO_3$ crystal. Accordingly, 0.0054 gram of the test polymer and 0.024 gram sodium carbonate are dissolved in 50 gram water. The transmittance is set at 100% as the starting value. Then, calcium carbonate is created after an injection of 0.0166 gram calcium chloride at the start of the test over 2 seconds. The transmittance of the system is recorded with a Metler Toledo "phototrode" (a combination LED light source and light detector) over 10 minutes. The loss of transmittance (LoT %) is reported as the difference between the start and end transmittance values. Low LoT % value indicates relatively good scale inhibition properties of the polymer sample by inhibiting the formation of relatively large calcium carbonate crystals.

Accordingly, for each of the seven (7) polymer formulations noted above, the LoT % is provided below along with a listing of the number average molecular weight (Mn) in grams per mole:

TABLE 1

| Scale Inhibition Test | | |
|---|---|---|
| Polymer | Mn | LoT % |
| Example 1 - Polyitaconic acid (84.0% by weight) - Poly(2-acrylamido-2-methylpropane sulfonic acid) (16.0% by weight) | 3860 | 18.5 |
| Example 2 - Polyitaconic acid (80.0% by weight) - Poly(2-acrylamido-2-methylpropane sulfonic acid) (20.0% by weight) | 2860 | 3.5 |
| Example 3 - Polyitaconic acid (76.0% by weight) - Poly(2-acrylamido-2-methylpropane sulfonic acid) (24.0% by weight) | 4180 | 2.2 |
| Example 4 - Polyitaconic acid (76.0% by weight) - Poly(2-acrylamido-2-methylpropane sulfonic acid) (24.0% by weight) | 5700 | 61.3 |
| Example 5 - Polyitaconic acid (70.0% by weight) - Poly(2-acrylamido-2-methylpropane sulfonic acid) (30.0% by weight) | 3230 | 2.1 |
| Example 6 - Polyitaconic acid (65.0% by weight) - Poly(2-acrylamido-2-methylpropane sulfonic acid) (35.0% by weight) | 3280 | 2.5 |
| Example 7 - Polyitaconic acid (55.0% by weight) - Poly(2-acrylamido-2-methylpropane sulfonic acid) (45.0% by weight) | 3740 | 2.8 |

As may be appreciated, relatively low LoT % values indicates relatively good dispersing properties of the polymer sample by inhibiting the formation of relatively large calcium carbonate crystals. As can be observed, a LoT % of 18.5 was achieved with an itaconic acid-AMPS copolymer where the level of AMPS was 16% by weight and an LoT % of 3.5 was achieved with an itaconic acid-AMPS copolymer where the level of AMPS was 20% by weight. However for itaconic acid-AMPS copolymers where the level of AMPS was above 20% by weight, and by way of example, at 24% by weight, the LoT % drops to a value of <3.0, indicating relatively good dispersing properties of such polymer. In addition, it can be observed that when the value of the number average molecular weight (Mn) is at 5700, the LoT % values also increase significantly to a value of 61.3%. Accordingly, as noted herein, the value of Mn for the itaconic acid/AMPS copolymers herein are preferably in the range of 1000-4200 grams per mole.

Exemplary automatic dishwasher detergent formulations were then prepared based on the following formulation:

TABLE 2

Dishwasher Detergent Formulations

| Ingredient | Per dose (in grams) |
|---|---|
| Sodium carbonate (dense grade) | 6.00 |
| Sodium percarbonate (coated grade) | 2.16 |
| TAED (Tetraacetylethylenediamine) | 0.10 |
| Polymer from examples 1-7 | 0.70 |
| Protease Excellenz P1000 | 0.18 |
| Amylase Excellenz S1000 | 0.09 |
| Sodium citrate dihydrate | 1.20 |
| Hydrous sodium silicate | 0.20 |
| BASF Plurafac SLF 180 | 0.63 |
| Total per dose | 11.26 |

As can be observed, these detergent formulations included 0.7 grams of each of the polymer produced in Examples 1-7 noted above. This therefore provided seven (7) dishwashing formulations where each contained 6.2% by weight of an itaconic acid/AMPS copolymer. These seven (7) formulations were then tested in parallel over 5 dishwashing cycles and evaluated for filming score per ASTM D3556-14 (Nov. 1, 2014). More specifically, automatic dish washing performance was measured according to ASTM D3556-14, using four (4) identical Maytag dishwasher in parallel, with water hardness set at 300 ppm. Evaluation of filming and spotting on 8 glasses was done after 5 cycles according to the ASTM D3556-14 method. Performance is reported according to the ASTM method as a score for spotting on glass and as a score for filming on glass, both on a scale of 1 to 5. A lower number indicates relatively less spotting/filming. The results are provided below in Table 3, along with the Mn and Lot % values noted above:

TABLE 3

Testing of Dishwashing Formulations Containing Different Poly(itaconic acid)-AMPS Copolymers

| Polymer Example Number in ADW Formula | % AMPS | Mn | LoT % | Filming score per ASTM D3556 |
|---|---|---|---|---|
| 1 | 16 | 3860 | 18.5 | 3.5; 3.9 |
| 2 | 20 | 2860 | 3.5 | 4 |
| 3 | 24 | 4180 | 2.2 | 2.2 |
| 4 | 24 | 23400 | 61.3 | 3.25 |
| 5 | 30 | 3230 | 2.1 | 2; 2.2 |
| 6 | 35 | 3280 | 2.5 | 2 |
| 7 | 45 | 3740 | 2.8 | 2.5; 2.9 |

As can be observed from the above utilizing a poly (itaconic acid)-AMPS copolymer with a level of AMPS in the range of 21.0 wt. % to 45.0 wt. %, where the copolymer has a Mn value in the range of 1000 to 4500 grams per mole, and where the copolymer is present in the dishwashing formulation at a level of 0.3% by weight to 15.0% by weight, and there is less than 1.0% by weight of a second polymeric ingredient B, provides a dishwashing formulation that provided effective performance suitable for use in domestic dishwashing applications.

Additional testing focused on Example 3, a polyitaconic acid-AMPS copolymer where the level of AMPS was preferably at 24.0% by weight and the poly(itaconic acid) is present at a level of 76.0 wt. %, where such copolymer has a number average molecular weight (Mn) of 4180 grams per mole. A second exemplary dishwashing formulation was prepared from this copolymer as follows:

TABLE 4

Dishwasher Detergent Formulations Utilizing Polymer Example 3

| Ingredient | Per dose (in grams) |
|---|---|
| Sodium carbonate (dense grade) | Variable |
| Sodium percarbonate (coated grade) | 2.16 |
| TAED (Tetraacetylethylenediamine) | 0.10 |
| Polymer from Example 3 | 0.70 |
| Protease Excellenz P1000 | 0.18 |
| Amylase Excellenz S1000 | 0.09 |
| Sodium citrate dihydrate | 1.20 |
| Hydrous sodium silicate | 0.20 |
| BASF Plurafac SLF 180 | 0.63 |
| Total per dose | Variable |

To the above formulation was added from 3.75 grams to 10.75 grams of sodium carbonate. Four formulations were therefore prepared as identified in Table 5 below. These four formulations were then tested for filming performance per ASTM D3556 as noted herein:

TABLE 5

Effect of Varying Sodium Carbonate Dose On Dishwashing Formulations

| Amount of sodium carbonate (grams) | Dose total weight (grams) | Filming score per ASTM D3556 |
|---|---|---|
| 10.75 | 16.01 | 3.2 |
| 8 | 13.26 | 3.1 |
| 6 | 11.26 | 3.1 |
| 3.75 | 9.01 | 3.0 |

As can be observed from the above, a dishwashing formulation herein, that relies upon the use of a poly (itaconic acid-co-AMPS) copolymer, where the poly (itaconic acid) is present at 76.0 wt. % in the copolymer and the AMPS is present at 24.0 wt. % in the copolymer, wherein the copolymer has a Mn value in the range of 1000-4500 grams per mole, wherein such copolymer is present in the dishwashing formulation at a level of 0.3% by weight to 15.0% by weight, and wherein the presence of any second polymer is avoided and/or limited to a presence of up to but not including 1.0 wt. % in such dishwashing formulation, provides an effective formulation for domestic dishwashing applications. As can be observed, such a formulation allows for the use of such copolymer over a range of sodium carbonate, namely the level of sodium carbonate in the dishwashing formulation may vary from 40.0 wt. % to 68.0 wt. % with relatively small effect on filming properties.

Characterization Protocols

1. Moisture Content

A moisture scale analyzer was employed that records weight as function of time, while maintaining the sample at 110° C. using an infrared heater. When a constant weight is recorded for 30 seconds, the test is completed and the weight recorded as a percent decrease from the initial weight. All moisture contents are expressed as weight percent.

2. Determination of pH

All pHs are reported in solutions at 10 wt. % in RO water at room temperature. The pH probe was a Tris-Compatible flat sensor. The pH meter is calibrated using pH=4 and pH=7 standard solutions prior to any measurements.

3. Molecular Weight Determinations

Gel Permeation Chromatography (GPC) was used to determine molecular weights. The GPC is first equilibrated with the eluent (1.67% sodium nitrate in HPLC-grade water) through three TOSOH Bioscience 08026 GPC columns for approximately one hour. A refractive index detector (RID) was used to measure signal concentration. The RID is purged for 20 minutes before sample analysis is started. The following instrument conditions are used: Eluent: 1.67 wt % sodium nitrate in HPLC-grade water with inline degasser; Flow Rate: 1.0 mL/min; Run Time: 45 min; Injection volume: 100 µL; Draw/Eject Speed: 200 µL/min; RID Optics Temperature: 40° C.; Automatic Purge: 1 min; Column Temperature: 35° C.

A 1.0 wt. % polymer solution is prepared using the GPC eluent solution as solvent. This solution is filtered with a 0.2 µM syringe-tip filter into a 2 mL HPLC vial which is then crimped closed. The vial is placed into the GPC autosampler and the chromatographic run is initiated. Molecular weight calibration was done using 6 polyacrylic acid standards with molecular weights ranging from 1000 g/mole to 1,360,000 g/mole, and with itaconic acid (monomer molecular weights 130). The 7 standards are used to create a 3rd order polynomial correlation between peak elution time and molecular weights. Each unknown sample is evaluated using this calibration function.

Conversion was calculated by the relative area of the residual monomer peak (with the longest elution time) over the total (polymer+monomer) area. Conversion is expressed as a weight percentage.

4.0 Determination of Residual Monomer and Polymerization by-Products

High Performance Liquid Chromatography (HPLC) was used to determine the amount of residual monomers (itaconic acid (IA) or and 2-acrylomido-2-methylpropane-sulfonic acid (AMPS)) and polymerization by-products such as mesaconic acid (MA) or citraconic acid (CA). The HPLC ran a gradient of eluent (95% of a 0.1 wt. % phosphoric acid aqueous solution and 5% acetonitrile held constant for 5 minutes, then gradient to 60% of a 0.1 wt. % phosphoric acid aqueous solution and 40% acetonitrile over 10 minutes) through a reverse phase C18 column. A UV detector at 210 nm is used to measure signal concentration. The following instrument conditions are used: Flow Rate: 2.0 mL/min; Run Time: 15 min; Injection volume: 25 µL; Column Temperature: 23° C. A 0.5 wt. % polymer solution with fumaric acid as internal standard is prepared using the HPLC eluent solution as solvent. This solution is filtered with a 0.2 µM syringe-tip filter into a 2 mL HPLC vial which is then crimped closed. The peak area of each monomer is calculated and converted to its weight percentage of the total sample by a calibration step with samples of known concentrations. The response of each monomer or polymerization by-product is calibrated by the area of monomer peak at its elution time against the concentration of a standard solution. Residual monomer concentration or polymerization by-product is expressed as a weight percentage.

What is claimed:
1. A dishwasher detergent formulation comprising:
(a) a first copolymer A having the following structure:

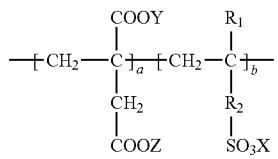

where $R_1$ is a hydrogen, or a —$CH_3$, —$CH_2CH_3$, —$CH_2CH_2CH_3$ group;
X, Y and Z are either hydrogen or Na+, Li+, K+ and/or $NH_4$+ and can be the same or different;
$R_2$ is an amido group (—CONH—) to provide acrylamide-alkyl sulfonic acid functionality (—CONH—$R_3$—$SO_3X$) wherein $R_3$ is a —$CH_2$—, —$CH_2CH_2$—, —$CH_2$—$CH_2$—$CH_2$—, —C—$(CH_3)_2$ or —C—$(CH_3)_2$—$CH_2$— group;
wherein the weight percent of repeat unit "a" in said copolymer is present at a level of 55.0 wt. % to 79.0 wt. % and the weight percent of repeat unit "b" in said copolymer is present at a level of 45.0 wt. % to 21.0 wt. % and wherein copolymer A has a number average molecular weight (Mn) from 1000 to 4500 grams per mole;
(b) a second polymeric ingredient B selected from one or more of the following:
(1) a homopolymer or copolymer of poly(acrylic acid);
(2) a homopolymer or copolymer of a poly(alkylacrylic acid);
(3) poly(aspartic acid); or
(4) poly(carboxy methyl inulin); and
wherein said dishwasher formulation 3.0% by weight to 12.0% by weight copolymer A and up to and including 0.9% by weight of said second polymeric ingredient B.
2. The dishwashing formulation of claim 1 wherein the weight percent of repeat unit "a" in said copolymer is 70.0 wt. % to 79.0 wt. % and the weight percent of repeat unit "b" in in the range of 30.0 wt. % to 21.0 wt. %.
3. The dishwashing formulation of claim 1 wherein said copolymer A has a number average molecular weight (Mn) of 1000-4200 g/mole.
4. The dishwashing formulation of claim 1 wherein said copolymer A has a number average molecular weight (Mn) of 2000-4200 g/mole.
5. The dishwashing formulation of claim 1 wherein said formulation is comprised within a water dissolvable film and said formulation has a weight of 9.0 grams to 16.0 grams.

6. The dishwashing formulation of claim 1 wherein said dishwashing formulation comprises ≤0.10% by weight of a phosphonate.

7. The dishwashing formulation of claim 1 wherein copolymer A has by-products of the polymerization of citraconic and mesaconic acid of less than 3.0% by weight.

8. The dishwashing formulation of claim 1, wherein said formulation comprises up to and inclusive of 0.8% by weight of said second polymeric ingredient B.

9. The dishwashing formulation of claim 1, wherein said formulation comprises up to and inclusive of 0.7% by weight of said second polymeric ingredient B.

10. The dishwashing formulation of claim 1, wherein said formulation comprises up to and inclusive of 0.6% by weight of said second polymeric ingredient B.

11. The dishwashing formulation of claim 1, wherein said formulation comprises up to and inclusive of 0.5% by weight of said second polymeric ingredient B.

12. The dishwashing formulation of claim 1, wherein said formulation comprises up to and inclusive of 0.4% by weight of said second polymeric ingredient B.

13. The dishwashing formulation of claim 1, wherein said formulation comprises up to and inclusive of 0.3% by weight of said second polymeric ingredient B.

14. The dishwashing formulation of claim 1, wherein said formulation comprises up to and inclusive of 0.2% by weight of said second polymeric ingredient B.

15. The dishwashing formulation of claim 1, wherein said formulation comprises up to and inclusive of 0.1% by weight of said second polymeric ingredient B.

16. The dishwashing formulation of claim 1, wherein said formulation does not comprise a second polymeric ingredient.

17. The dishwashing formulation of claim 1 wherein copolymer A is present at a level of 4.0% by weight to 10.0% by weight.

* * * * *